(12) United States Patent
Bradley et al.

(10) Patent No.: US 12,073,331 B2
(45) Date of Patent: Aug. 27, 2024

(54) ESTIMATING FUEL ECONOMY

(71) Applicant: Cambridge Mobile Telematics Inc., Cambridge, MA (US)

(72) Inventors: William Bradley, Arlington, MA (US); Juan Martin Munoz Valdez, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 791 days.

(21) Appl. No.: 16/545,303

(22) Filed: Aug. 20, 2019

(65) Prior Publication Data

US 2021/0056443 A1 Feb. 25, 2021

(51) Int. Cl.
G07C 5/08 (2006.01)
B60K 35/28 (2024.01)
G06N 5/04 (2023.01)
G07C 5/00 (2006.01)

(52) U.S. Cl.
CPC ............... *G06N 5/04* (2013.01); *G07C 5/008* (2013.01); *G07C 5/08* (2013.01); *G07C 5/085* (2013.01); *B60K 35/28* (2024.01); *B60K 2360/174* (2024.01); *B60L 2260/54* (2013.01)

(58) Field of Classification Search
None
See application file for complete search history.

(56) References Cited

U.S. PATENT DOCUMENTS 6,738,697 B2  5/2004  Breed
10,140,785 B1*  11/2018  Cox .................. G01F 9/023
10,580,084 B1*  3/2020  Davis .................. H04R 29/002
2009/0099724 A1  4/2009  Kranz et al.
2010/0010732 A1*  1/2010  Hartman ............ G01C 21/3484
                                                          701/532
2011/0172873 A1*  7/2011  Szwabowski .......... G06Q 50/30
                                                            701/29.5
2014/0005917 A1*  1/2014  Leggett .................. G06Q 10/00
                                                          701/123
2014/0257579 A1*  9/2014  Darrow ................. F04B 49/106
                                                            700/283

(Continued)

FOREIGN PATENT DOCUMENTS

JP  2002-334168      11/2002
JP  2008102813 A *   5/2008

(Continued)

OTHER PUBLICATIONS

Translation of KR 20150059683 A (Year: 2015).*

(Continued)

*Primary Examiner* — James J Lee
*Assistant Examiner* — David Hatch
(74) *Attorney, Agent, or Firm* — Fish & Richardson P.C.

(57) ABSTRACT

In an aspect, a fuel economy of a vehicle is determined by: receiving telematics data produced at least partly by one or more sensors at a vehicle; identifying, based at least partly on the telematics data, one or more fueling events of the vehicle; determining, for each fueling event of the one or more fueling events, an amount of fuel added to the vehicle for that fueling event; and determining, based at least partly on the amount of fuel added to the vehicle for each fueling event and the telematics data, a fuel economy of the vehicle.

44 Claims, 8 Drawing Sheets

(56) References Cited

U.S. PATENT DOCUMENTS

| | | |
|---|---|---|
| 2016/0003621 A1 | 1/2016 | Koenig et al. |
| 2016/0035001 A1 | 2/2016 | Driscoll et al. |
| 2016/0180612 A1 | 6/2016 | Wittliff |
| 2017/0109722 A1* | 4/2017 | Morris ................ G06Q 20/327 |
| 2018/0012204 A1* | 1/2018 | Shetty ................ G07F 13/025 |
| 2018/0047107 A1 | 2/2018 | Perl et al. |
| 2018/0114378 A1 | 4/2018 | Slusar |

FOREIGN PATENT DOCUMENTS

| | | | |
|---|---|---|---|
| JP | 2012-053032 | | 3/2012 |
| JP | 2016-110279 | | 6/2016 |
| JP | 2018-049477 | | 3/2018 |
| JP | 2019-092310 | | 6/2019 |
| KR | 20020058685 A | * | 7/2002 |
| KR | 20150059683 A | * | 6/2015 |

OTHER PUBLICATIONS

Translation of KR 20020058685 A (Year: 2002).*
Translation of JP 2008102813 A (Year: 2008).*
PCT International Search Report and Written Opinion in International Appln. No. PCT/US2020/044489, Oct. 23, 2020, 22 pages.
PCT International Preliminary Report on Patentability in International Appln. No. PCT/US2020/044489, dated Mar. 3, 2022, 20 pages.
EP European Search Report in European Appln. No. 20855208.3, dated Sep. 8, 2022, 7 pages.
Office Action in Japanese Appln. No. 2022-511318, mailed on Jun. 9, 2023, 11 pages.

* cited by examiner

ESTIMATING FUEL ECONOMY

TECHNICAL FIELD

This description generally relates to estimating the fuel economy of a vehicle.

BACKGROUND

The fuel economy of a vehicle relates distance traveled by the vehicle to the amount of fuel consumed. Fuel consumption (a measure of fuel economy) can be expressed, for example, in terms of volume of fuel to travel a distance, or the distance traveled per unit volume of fuel consumed (such as, miles per gallon). Since fuel consumption of vehicles can be a significant factor in air pollution, and since importation of motor fuel can be a large part of a nation's foreign trade, many countries impose requirements for fuel economy. Different methods may be used to approximate the actual fuel economy performance of a vehicle. The energy in fuel is typically used to overcome various losses (for example, wind resistance, tire drag, and so forth) encountered while propelling the vehicle, and in providing power to vehicle systems such as ignition or air conditioning. Various strategies can be employed to reduce losses at each of the conversions between the energy in the fuel and the kinetic energy of the vehicle. Furthermore, driver behavior can affect fuel economy. For example, maneuvers such as sudden acceleration and heavy braking may waste energy.

SUMMARY

In general, in an aspect, a system if provided. The system includes one or more processors. The system includes computer storage storing executable computer instructions in which, when executed by the one or more processers, cause the one or more processors to perform one or more operations. The one or more operations include receiving telematics data produced at least partly by one or more sensors at a vehicle. The one or more operations include identifying, based at least partly on the telematics data, one or more fueling events of the vehicle. The one or more operations include determining, for each fueling event of the one or more fueling events, an amount of fuel added to the vehicle for that fueling event. The one or more operations include determining, based at least partly on the amount of fuel added to the vehicle for each fueling event and the telematics data, a fuel economy of the vehicle.

The one or more sensors can include at least one sensor included within a mobile device. The telematics data can include at least one of: acceleration data of the vehicle, velocity data of a vehicle, orientation data of a vehicle, or location data of the vehicle. The amount of fuel can include an amount of gasoline, diesel, ethanol, biodiesel, propane, or compressed natural gas. The amount of fuel can include an amount of electrical energy.

The one or more operations can include receiving external data from an external server, the external data including geographical data. Identifying a fueling event can include determining that, based at least partly on the external data, the vehicle has come to a stop and is within a predetermined range of a fueling station. Identifying a fueling event can include identifying, based at least partly on the telematics data, one or more vibrations of the vehicle. Identifying a fueling event can include determining if the vibrations indicate a fueling event. Identifying a fueling event can include transmitting a notification to a mobile device of a user of the vehicle in which, when the mobile device receives the notification, the notification causes the mobile device to render a user interface having one or more graphical representations, the one or more graphical representations including one or more user-selectable icons and prompting the user to confirm that a fueling event is occurring; and receiving, from the mobile device, user input data indicating the confirmation that the fueling event is occurring.

Determining the amount of fuel can include transmitting a notification to a mobile device of a user of the vehicle in which, when the mobile device receives the notification, the notification causes the mobile device to render a user interface having one or more graphical representations prompting the user to provide the amount of fuel; and receiving, from the mobile device, user input data indicating the amount of fuel. The one or more graphical representations can include one or more data fields prompting the user to provide one or more values indicating the amount of fuel, and in which the user input data represents the one or more values entered by the user. The one or more graphical representations can include one or more data fields. The one or more graphical representations can prompt the user to provide the amount of fuel by capturing, using an imaging sensor of the mobile device, image data representing a document that indicates the amount of fuel. The mobile device can be configured to perform one or more optical character recognition techniques on the image data and automatically provide one or more values to the one or more data fields indicating the amount of fuel based on a result of performing. The user input data can include image data representing an image of a document indicating the amount of fuel. Determining the amount of fuel can include performing one or more optical character recognition techniques on the image data.

Determining the amount of fuel can include receiving, from a financial institution of the user, transaction data indicating the amount of fuel. Determining the amount of fuel can include receiving from a communications device at a fuel dispenser, transaction data indicating the amount of fuel. Determining the amount of fuel can include determining, based at least partly on the telematics data, a fueling period of the fueling event, the fueling period including a start time of the fueling event and a stop time of the fueling event. Determining the amount of fuel can include determining, based at least partly on the telematics data, a flow rate of the fueling event. Determining the flow rate can include determining a vibrational pattern of the vehicle. Determining the flow rate can include detecting a fueling pattern of a user of the vehicle.

The one or more operations can include transmitting a notification to a mobile device of a user of the vehicle in which, when the mobile device receives the notification, the notification causes the mobile device to render a user interface having one or more graphical representations indicating the determined fuel economy. The one or more operations can include identifying, based on the telematics data, a first route of travel by the user that corresponds to the determined fuel economy. The one or more operations can include identifying a second route that is different than the first route, the second route capable of increasing the fuel economy relative to the first route. The one or more operations can include generating a geographical representation that includes geographical locations corresponding to the second route. The one or more operations can include transmitting, to a mobile device of the user, a notification in which, when the mobile device receives the notification, the notification causes the mobile device to render a user interface including the geographical representation, the geographical representation including an overlay indicating the second route.

The one or more operations can include determining, based on the telematics data, a driving profile of a user of the vehicle. The vehicle can have a first type, and the one or more operations can include determining a second vehicle having a second type based, at least partly, on the driving profile and the determined fuel economy. The one or more operations can include identifying, based on the driving profile, one or more factors of the driving profile that caused, at least partly, the determined fuel economy. The one or more operations can include transmitting a notification to a mobile device of a user of the vehicle in which, when the mobile device receives the notification, the notification causes the mobile device to render a user interface having one or more graphical representations indicating the identified one or more factors.

The one or more operations can include determining, based on the received telematics data and the determined fuel economy, that the vehicle is likely experiencing one or more mechanical issues. The one or more operations can include transmitting a notification to a mobile device of a user of the vehicle in which, when the mobile device receives the notification, the notification causes the mobile device to render a user interface having one or more graphical representations indicating that the vehicle is likely experiencing one or more mechanical issues. The one or more graphical representations can include a geographical representation having one or more icons that indicate locations of vehicle mechanic service providers.

These and other aspects, features, and implementations can be expressed as methods, apparatus, systems, components, program products, methods of doing business, means or steps for performing a function, and in other ways, and will become apparent from the following descriptions, including the claims.

Implementations of the present disclosure can provide at least one or more of the following advantages. The technology can determine fuel economy more accurately when compared with conventional systems for determining fuel economy. Furthermore, as opposed to conventional systems for determining fuel economy, the technology can identify one or more causes of the determined fuel economy, including driving behavior, weather, and experienced traffic conditions. Because the technology can identify one or more causes of the determined fuel economy, the technology, unlike conventional systems, can recommend one or more actions for increasing the fuel economy of the vehicle relative to the determined fuel economy of the vehicle. Furthermore, the technology can provide means for a user to interact with the technology that, when compared with conventional systems, increases the efficiency with which the user can interact with the technology.

DETAILED DESCRIPTION

Figure 1:
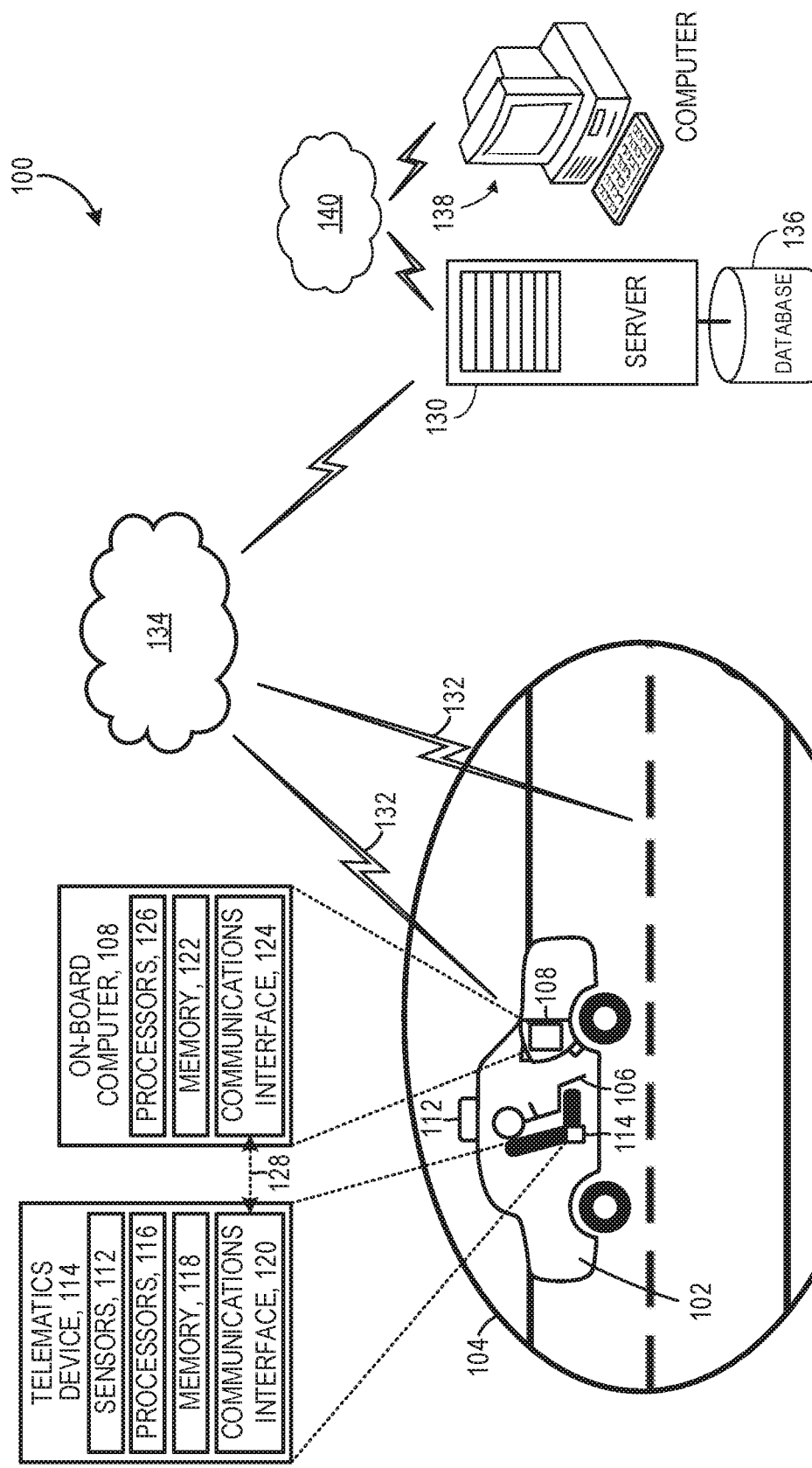
FIG. 1 is a schematic diagram illustrating a fuel economy estimation technology.

A vehicle's fuel economy can depend on several factors. For example, among others, fuel economy can depend on one or more of the following: weather; speed; driving style; fuel quality, characteristics of the vehicle, or road traffic. However, traditional approaches to determining fuel economy of a vehicle typically involve determining the fuel economy under ideal conditions. For example, traditional approaches may lack real-world testing and apply to a limited set of environments (for example, city or highway driving). Under traditional approaches, the details related to the fuel economy for specific vehicles under real-world conditions can be complex and time-consuming.

The fuel economy determination technology described in this specification (sometimes referred to as "the technology") can acquire and process sensor data generated at a vehicle to determine one or more metrics relating to the fuel economy for the vehicle. To do so, the technology can receive telematics data from one or more sensors installed in the vehicle, included in a telematics device (for example, a smart phone) brought into the vehicle, or both. Additionally, the technology can receive external data from external servers, such as servers associated with weather services and servers associated with geographical services (for example, map services). Other sources may also provide data and information relevant to fuel economy determinations.

Generally, the technology can determine one or more relationships between the distance traveled by the vehicle and the fuel consumed by the vehicle, otherwise known as the fuel economy of the vehicle.

For example, the technology can use the acquired telematics data (and, in some implementations, external data received from external sources) to determine one or more metrics corresponding to a fueling event of the vehicle. The fueling event can include one or more of the following: the time of arrival to a fueling station; a start time corresponding to when fuel was starting to be added to the vehicle, an end time corresponding to when fuel was no longer being added to the vehicle, and the time the vehicle left the fueling station. The technology can use the acquired telematics data to determine one or more metrics corresponding to the motion and position of the vehicle in between two fueling events. Based on the determined metrics, the technology can determine a fuel economy of the vehicle over an interval of time or over a number of events (such as, a number of fueling events).

In some implementations, the technology can use the determined fuel economy to, among others, monitor the fuel economy, transmit notifications to a mobile device of the user, or both. The determined fuel economy can be used to monitor for indications of poor fuel economy, monitor for indications of drastic changes in fuel economy (for example, a change in fuel economy between two fueling events of 10 miles per gallon), or both. The technology can recommend, to the user of the vehicle, specific actions to take to address these indications based on the monitoring and the acquired telematics data.

For example, if the monitoring indicates that the vehicle is performing subpar in terms of fuel economy, and the telematics data indicates that the user accelerates too rapidly and too often such that the user's driving habits are causing, at least partly, the subpar fuel economy performance, the technology can send a notification to the mobile device of the user explaining the cause of the subpar fuel economy performance. As another example, if the monitoring indicates that the vehicle is performing subpar, and the telematics data indicates that one or more of the routes the user traversed between the two fueling events are causing the subpar fuel economy performance (for example, the user is causing the vehicle to traverse roads with a high frequency of stop lights), the technology can send a notification to the mobile device of the user that explains the cause of the subpar fuel economy performance. Additionally, or alternatively, the notification can include one or more actions the user can take, such as adjusting the user's driving habits or recommending alternate routes to the user, to increase the vehicle's fuel economy performance.

In some implementations, the technology can determine, based on the determined fuel economy and the telematics data, that the vehicle may have a mechanical issue at least partially causing the subpar fuel economy performance, the technology can send a notification to the mobile device indicating that the subpar fuel economy is at least partially caused by a mechanical issue of the vehicle. In such implementations, the technology can recommend that the user have mechanical services performed on the vehicle. The technology can also include a geographical representation of a specific area with indicators indicating the location of nearby mechanic service providers, with the notification indicating that the subpar fuel economy is caused by a likely mechanical issue. In some implementations, the technology can determine that the external data indicates that external factors (such as weather, vehicle traffic, altitude, and so forth) are at least partially causing the subpar fuel economy performance, and the technology can send a notification to the mobile device indicating that the subpar fuel economy performance is at least partially caused by the external factors.

In some implementations, the technology can compare the user's driving habits with the driving habits of other users of the technology, and the technology can recommend a vehicle (for example, in terms of one or more of: make; model; or year) optimized for the user's driving habits that relate to fuel economy performance. For example, assume that, measured over a year-long period, the user's driving habits cause a first type of vehicle's average fuel economy performance to be 10 miles per gallon less than the average fuel economy performance of the first type of vehicle when driven by all users of the first type of vehicle. The technology can compare the negative effects that the user's driving habits have on the average fuel economy performance of the first type of vehicle with effects on average fuel economy performance of other types of vehicles of other users having similar driving habits and, if it is determined that the other user's driving performance have less of an effect on the average fuel economy performance of the other types of vehicles, the technology can recommend that the user purchase at least one of the other types of vehicles.

In some implementations, the technology is capable of using the determined fuel economies for users of the technology to generate an aggregated fuel efficiency (such as a mean fuel efficiency, a median fuel efficiency, and so forth) for a specific vehicle, a vehicle type, a geographic location, a particular time span, or a combination of them.

FIG. 1 is a schematic diagram illustrating a fuel economy estimation technology. Generally, the technology 100 can include a variety of components and devices that cooperate to perform the activities and functions described in this specification. Each of the components and devices can include one or more hardware components, software applications, and data communication channels for communicating data between the hardware components and software applications of devices that are part of the technology 100. Some of the components and devices can be implemented as computer-readable storage mediums containing computer-readable instructions for execution by one or more processors within the technology 100. The technology 100 shown in FIG. 1 can include additional, fewer, or alternate components, including those discussed previously and later.

Referring to FIG. 1, the technology 100 is capable of determining a fuel efficiency of a vehicle 102 as it operates within an environment 104. The vehicle 102 is capable of being operated by a driver 106 (for example, a conventional vehicle), by an on-board computer 108 (for example, an autonomous vehicle), or by a combination of a driver 106 and an on-board computer 108 (for example, a semi-autonomous vehicle). However, the techniques described in this specification are not limited to the shown vehicle 102, and the term "vehicle" is defined broadly to include, for example, any kind of ground conveyance such as a car, truck, bus, bicycle, motorcycle, or recreational vehicle, among others. The environment 104 may include surroundings, such as a road, infrastructure, pedestrians, or other vehicles, and conditions, such as the time of day, the weather, or the level of lighting, in which the vehicle 102 operates.

To monitor the vehicle's 102 movement as it operates throughout the environment 104, the vehicle 102 can include one or more sensors 112. In some implementations, the one or more sensors 112 include one or more of the following: one or more accelerometers, one or more speed sensors, or one or more position sensors (such as a Global Positioning System (GPS)). In such instances, the one or more sensors 112 can monitor one or more of the following: acceleration, speed, or position of the vehicle 102. In some implementations, the one or more sensors 112 include one or more of the following: one or more audio sensors (such as a microphone), or one or more image sensors (such as an in-cabin camera). In such instances, the one or more sensors 112 can monitor, for example, the driver 106 of the vehicle 102. In some implementations, the one or more sensors 112 include one or more of the following: one or more radar systems, one or more LIDAR systems, or one or more sonar systems. In such instances, the one or more sensors 112 can monitor, for example, the vehicle 102 or other features in the surrounding environment 104.

In general, the vehicle 102 can include any number or type of sensors 112 suitable to monitor the vehicle 102, its driver 106, and the surrounding environment 104, including, among others, one or more of the following: accelerometers, magnetometers, gyroscopes, inertial measurement units (IMUs), speed sensors, position sensors (such as a GPS), barometric sensors, weight sensors, engine sensors, alternator sensors, odometer sensors, vibration sensors, voltage sensors, oxygen sensors, biometric sensors, light sensors, image sensors, audio sensors, ultrasonic sensors, electronic control unit (ECU) devices, radar systems, LIDAR systems, or sonar systems.

The sensors 112 may be installed in (or on) the vehicle 102, included in one or more telematics devices 114 brought into the vehicle, or both. Each of the one or more telematics devices 114 may include one or more processors 116 and memory 118 to process and store the sensor data and other information, and a communications interface 120 to enable wired or wireless communications with other components or devices of the technology 100, such as the sensors 112, the on-board computer 108, and a server 130. The one or more telematics devices 114 can include an original equipment manufacturer (OEM) telematics device installed during manufacture of the vehicle 102, or an aftermarket telematics device connected, for example, through an On-Board Diagnostics (OBD) port of, or wireless communications connection to, the vehicle 102. Each of the one or more telematics devices 114 can be battery-powered, solar-powered, connected to the electrical system of the vehicle 102, or combinations of them. In some implementations, the one or more telematics devices 114 are capable of being mounted in or on the vehicle 102.

In some implementations, the telematics devices 114 are capable of being untethered from the vehicle 102 such that they are movable within or outside of the vehicle 102. In some implementations, the one or more telematics devices 114 include a tag device placed or affixed in the vehicle 102, such as tags of the kind described in U.S. patent application Ser. No. 14/529,812, entitled "System and Method for Obtaining Vehicle Telematics Data," filed Oct. 31, 2014 and U.S. patent application Ser. No. 16/407,502, entitled "Safety for Vehicle Users," filed May 9, 2019, the entire contents of all of which are incorporated by reference. In some implementations, the telematics devices 114 include a mobile device, such as a smartphone, a wearable device, a tablet computer, a laptop computer, or another portable computing device, and may not necessarily be a telematics device particularly dedicated to the vehicle 102. In some implementations, the telematics devices 114 include a combination of one or more tag devices and one or more mobile devices. In some implementations, the on-board computer 108 is capable of performing some or all of the functions of the telematics device 114.

In some implementations, the on-board computer 108 is capable of receiving and processing the sensor data to operate the vehicle 102 or to assist the driver 106 with operating the vehicle 102. In some implementations, the on-board computer 108 is capable of receiving the sensor data from the sensors 112, the telematics devices 114, or both, and can store the sensor data in a memory 122. In some implementations, the on-board computer 108 is capable of interfacing with some or all of the sensors 112 using a wired or wireless communications interface 124 to receive the sensor data. In some implementations, the telematics devices 114 are capable of interfacing with some or all of the sensors 112 using a wired or wireless communications interface 120 to receive the sensor data, and the on-board computer 108 and the telematics devices 114 are capable of establishing a communications channel 128 between one another to exchange the sensor data and other information. The communications channel 128 can be a wired or wireless communications channel, such as, among others, Bluetooth™, Wi-Fi™, cellular, Radio Frequency Identification (RFID), Near-Field Communication (NFC), or combinations of them. In some implementations, the on-board computer 108 or the one or more telematics devices 114, or both, is capable of receiving sensor data or other information from one or more components or devices in the surrounding environment 104, such as infrastructure or an on-board computer 108 or a telematics device 114 in another vehicle 102.

In some implementations, once received, one or more processors 126 of the on-board computer 108 are capable of processing the sensor data in accordance with software instructions or applications stored in the memory 122 to control, for example, the steering, throttle, or braking of the vehicle 102. To facilitate such control, the on-board computer 108 can be communicatively coupled with the controls or components of the vehicle 102 by various electrical or electromechanical components. In some implementations, such as those involving fully autonomous vehicles, the vehicle 102 is operable only by the on-board computer 108. In some implementations, the on-board computer 108 supplements the controls or components operated by the driver 106 of the vehicle 102, such as the steering wheel, the throttle pedal, or the brake pedal.

In various implementations, the technology 100 is capable of processing the sensor data to determine a fuel efficiency of the vehicle 102. In some cases, the on-board computer 108, the telematics devices 114, or both, are capable of processing the sensor data to carry out the fuel efficiency determination in accordance with the techniques described in this specification. In some cases, the on-board computer 108, the telematics device 114, or both, are capable of transmitting the sensor data to the server 130 for processing. For example, the on-board computer 108, the telematics devices 114, or both, can establish a communications channel 132 with a network 134 to exchange the sensor data and other information with the server 130. The network 134 can be the Internet, a cellular network, a Wi-Fi network, a local area network, a wide area network, a satellite network, or any other suitable data transmission network, or combinations of them. Once received, the server 130 is capable of storing the sensor data and other information in a database 136. The database 136 can be implemented using one or more non-transitory computer-readable storage mediums including, but not limited to, hard disk drives, solid-state drives, optical storage drives, or combinations of them.

In some implementations, the on-board computer 108, the telematics devices 114, or both, transmit the sensor data to the server 130 according to a conditional data upload protocol. For example, the on-board computer 108, telematics devices 114, or both, may transmit only a portion of the sensor data to the server 130, while maintaining other portions of the data in, for example, memory 118, 122. The transmitted portion of the sensor data can be data that is considered most likely to be useful in evaluating the safety performance of the vehicle 114. Later, if the server 130 determines that the stored portion of data may be of interest, the on-board computer 108, telematics device 114, or both, can transmit at least a portion of the stored sensor data to the server 130. The telematics devices 114 and the on-board computer 108 can follow a similar conditional data upload protocol when transmitting data between each other. Transmitting data according to the conditional data upload protocol can alleviate concerns related to bandwidth constraints and computational power constraints.

In some implementations, the sensor data is processed in accordance with a tiered data processing protocol. For example, the sensor data can be processed by the telematics devices 114 according to a first tier data processing algorithm, while the server 130 processes the data according to a second tier data processing algorithm. In such instances, the first tier data processing algorithm includes a simple, less computationally intensive algorithm (which can be less accurate) when compared to the second tier data processing algorithm. In some implementations, the tiered data processing protocol can include three tiers of data processing algorithms, where one telematics device 114 processes the data using a first tier algorithm, a second telematics device 114 processes data using a second tier algorithm, and the server 130 processes data using a third tier algorithm. Each tier can include a more computationally intensive and accurate algorithm when compared to a previous tier. Processing data in accordance with a tiered data processing protocol can alleviate concerns related to computational power constraints, bandwidth constraints, and computational speed constraints.

Although only one server 130, one database 136, and one computing device 138 are illustrated in FIG. 1, the technology 100 may include any number of computing devices and data storage devices located in a single place or distributed and communicatively connected using any number of networks.

Figure 2:
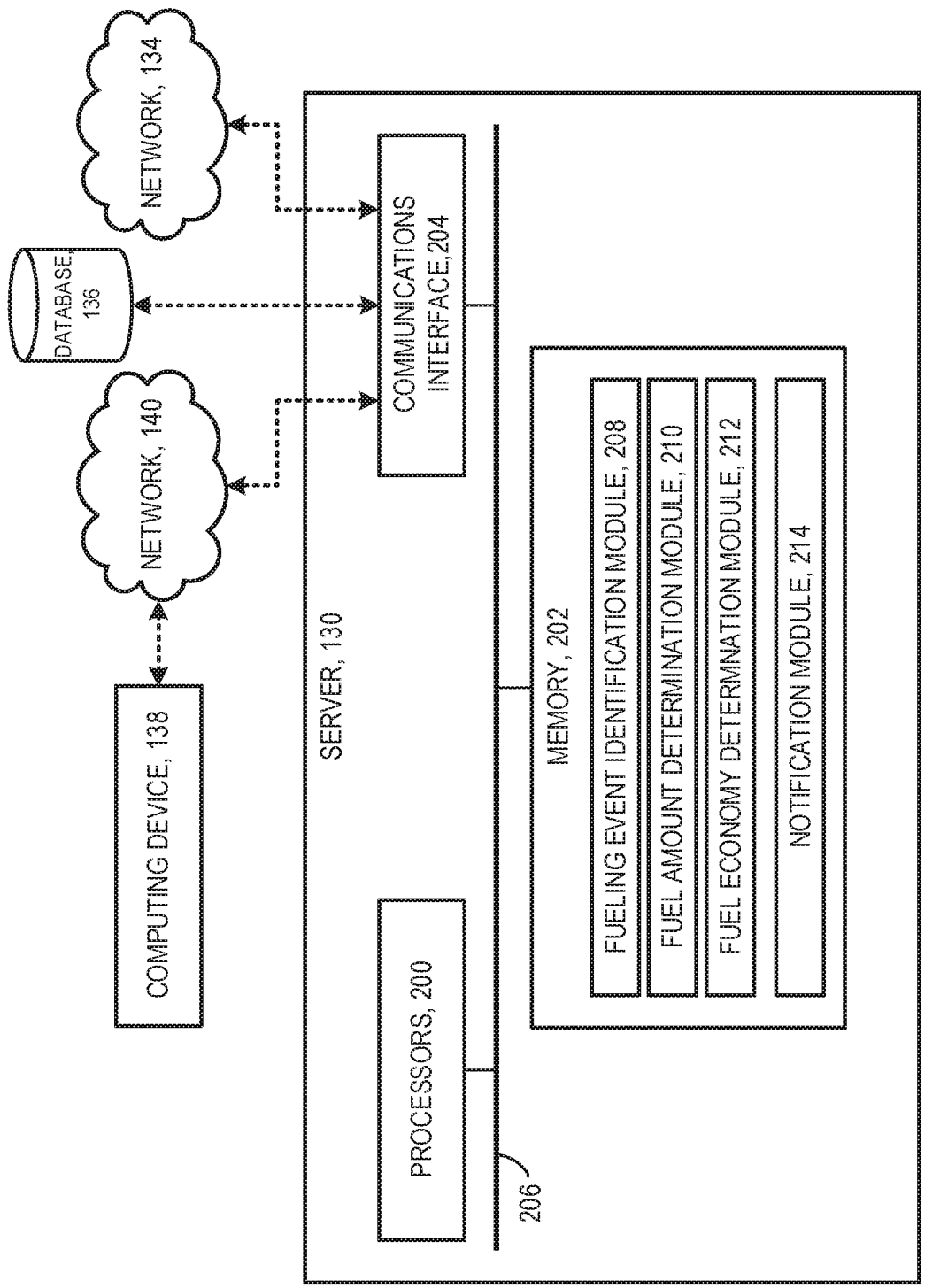
FIG. 2 is a block diagram illustrating an example server for estimating fuel economy.

FIG. 2 is a block diagram illustrating an example server 130 for estimating fuel economy. The shown server 130 includes hardware and software components, such as one or more processors 200, a memory 202, and a communication interface 204, which are interconnected by a data bus 206. The memory 202 can be any non-transitory computer-readable storage medium and can store computer-readable instructions executable by the processors 200. In the shown embodiment, the memory 202 stores executable instructions associated with a fueling event identification module 208, a fuel amount determination module 210, a fuel economy determination module 212, and a notification module 214 to enable the server 130 or other components and devices to carry out the techniques described in this specification. As used in this specification, the term "module" is defined broadly to include, for example, any code, program, firmware, software object, or other software device or arrangement that can be executed by one or more processors to perform one or more activities, functions, or facilities.

The fueling event identification module 208 is capable of receiving and processing the telematics data produced at the vehicle 102 to identify, based at least partly on the telematics data, one or more fueling events of the vehicle 102. As indicated previously, the telematics data can include one or more of: acceleration data of the vehicle 102 as the vehicle maneuvers throughout the environment 104, velocity data of the vehicle 102 as the vehicle 102 maneuvers throughout the environment 104, orientation data of the vehicle 102 as the vehicle 102 maneuvers throughout the environment 104, or location data (for example, GPS data) as the vehicle 102 maneuvers throughout the environment 104.

In some implementations, the fueling event identification module 208 identifies a fueling event of the vehicle 102 by determining that, based at least partly on the received telematics data, the vehicle 102 has come to a stop and is within a predetermined range of a fueling station. As used in this specification, a fueling station refers to a facility that sells fuel (such as, gasoline, electrical energy, etc.) and can include one or more fuel dispensers (such as, gas pumps, charging stations, etc.). As used in this specification, a fuel dispenser refers to a repository of fuel that can be used to refuel the vehicle 102. As used in this specification, the term fuel is defined broadly and covers any type of fuel that can be used to propel the vehicle 102, which can be based on a type of the vehicle 102. For example, fuel can refer to gasoline, diesel, ethanol, biodiesel, propane, compressed natural gas, electrical energy, or a combination of them. An illustrative example of the identification module 208 determining that the vehicle 102 has come to a stop and is within a predetermined range of a fueling station is provided later wither reference to FIG. 3.

Additionally, or alternatively, the fueling event identification module 208 can identify a fueling event by transmitting a notification to a mobile device of the driver 106 of the vehicle 102 in which, when the mobile device receives the notification, the notification causes the mobile device to render a user interface having one or more graphical representations prompting the driver 106 to confirm that the vehicle 102 is at the fueling station and that a fueling event is occurring. For example, the fueling event identification module 208 can use GPS data and acceleration data of the telematics data to determine that the vehicle 102 is stopped at a fueling station, and transmit a notification to the mobile device of the driver 106 to prompt the driver 106 to provide input data indicating that the vehicle 102 is being refueled at a fueling station.

In some implementations, the fueling event identification module 208 identifies a fueling event of the vehicle 102 by detecting, based at least partly on the telematics data, one or more vibrations of the vehicle 102, and determining if the vibrations indicate a fueling event. As used in this specification, a vibration refers to a mechanical phenomenon in which oscillations occur at an equilibrium point, and can be periodic or random. For example, the event identification module 208 can use one or more machine learning techniques (for example, neural network algorithms, Bayesian algorithms, and so forth) to associate one or more vibrational patterns detected in the telematics data (for example, the acceleration data) received over a first period of time (for example, a first three day period) with a fueling event of the vehicle 102. Then, if the fueling event identification module 208 detects the same (or similar) one or more vibrational patterns in telematics data received at a later period in time, the fueling event identification module 208 can determine that the one or more vibrational patterns indicate a fueling event is occurring. Alternatively, or additionally, the event identification module 208 can use telematics data corresponding to other vehicles having a same or similar type as the vehicle 102 and received from other users of the technology 100 to determine if the vibrations detected for the vehicle 102 indicate a fueling event of the vehicle 102. A same or similar type refers to one or more of the following: a same or similar make, a same or similar model, a same or similar body (such as, truck, sports utility vehicle, motorized mountain bike, car, hatchback, sedan, and so forth). The fueling event identification module 208 can, for example, associate one or more vibrational patterns with a fueling event for other vehicles of the same or similar type as the vehicle 102, and use that association to determine if a detected one or more vibrational patterns of the vehicle 102 indicates a fueling event for the vehicle 102. A detailed example of the fueling event identification module 208 detecting one or more vibrations of the vehicle 102 and determining if the vibrations indicate a fueling event is provided later with reference to FIGS. 4-5.

The fuel amount determination module 210 is capable of determining, for each fueling event of the one or more fueling events, an amount of fuel added to the vehicle 102. In some implementations, the fuel amount determination module 210 determines an amount of fuel added to the vehicle 102 by transmitting a notification to the mobile device of the driver 106 of the vehicle 102. The notification is capable of causing the mobile device to render a user interface having one or more graphical representations prompting the driver 106 to input the amount of fuel added to the vehicle 102. Once the driver 106 enters the amount of fuel added to the vehicle 102, the mobile device can transmit input data indicating the amount of fuel entered by the driver 106 to the fuel amount determination module 210. In some implementations, the user input data can include values entered by the driver 106 into one or more data fields of the user interface. For example, the user interface can include one or more input fields in which the driver 106 can input one or more numerical values. In some implementations, the user input data includes image data representing an image of a document indicating the amount of fuel. For example, the user interface can prompt the driver 106 to use an imaging sensor (such as, a camera) of the mobile device to capture an image of a receipt obtained after refueling the vehicle 102, in which the receipt may include some indication of the amount of fuel added to the vehicle 102. The mobile device can transmit image data representing the image of the receipt to the fuel amount determination module 210. Upon receiving the image data, the fuel amount determination module 210 can process the image data using one or more optical character recognition algorithms (or other character identification techniques) to determine the amount of fuel added to the vehicle 102. A more detailed example of a user interface used to determine an amount of fuel is described later with reference to FIG. 6.

In some implementations, the fuel amount determination module 210 is communicatively coupled to an external server corresponding to a financial account of the driver 106 to receive transaction data indicating the amount of fuel added to the vehicle 102. In such implementations, the fuel amount determination module 210 is capable of determining an amount of fuel added to the vehicle 102 by using the received transaction data received from the server corresponding to the financial account of the driver 106. For example, assuming that the driver 106 paid for the fueling event using an electronic payment device (such as, a credit card, a debit card, contactless payment devices, and so forth), the fuel amount determination module 210 can receive transaction data from an external server corresponding to a financial account associated with the electronic payment device, in which the transaction data indicates that the transaction took place at or near the time that the fueling event was identified by the fueling event identification module 208.

The fuel amount determination module 210 can also use, for example, location data included in the received telematics data to identify a particular fueling station that was used to refuel the vehicle 102 during the identified fueling event. Once the particular fueling station is identified, the fuel amount determination module 210 can send a request to a server associated with the particular fueling station for price data indicating the price charged per measurement of fuel (for example, price per gallon) by the particular fueling station during the time of the identified fueling event. Once the price data is received, the fuel amount determination module 210 can use the price data to determine the amount of fuel added to the vehicle 102 during the identified fueling event. By receiving the transaction data directly from the servers corresponding to the financial accounts of the user, the technology 100 can further improve, when compared to convention systems, the efficiency and simplicity of using the technology by reducing the number of steps a user performs to facilitate the estimation of fuel economy.

In some instances, the fuel amount determination module 210 may not be able to obtain data related to the price charged per measurement of fuel by a particular fueling station. In such cases, the fuel amount determination module 210 can estimate the value by using the price charged per measurement of fuel of nearby fueling stations. As an illustrative example, the fuel amount determination module 210 can obtain the price charged per measurement of fuel corresponding to one or more nearby fueling stations within a 5 mile radius of the particular fueling station, and aggregate the prices charged by the one or more nearby fueling stations (for example, determine an average, median, and so forth) to estimate the price charged by the particular fueling station.

In some implementations, the fuel amount determination module 210 is capable of receiving transaction data transmitted by a communications device at a fuel dispenser of a fueling station, in which the transaction data indicates the amount of fuel added to the vehicle 102 during the fueling event. In such implementations, the fuel amount determination module 210 is capable of using the transaction data transmitted by the communications device at the fuel dispenser to determine an amount of fuel added to the vehicle 102. For example, the fuel dispenser can include a near field communications device that is capable of transmitting, to the one or more telematics devices 114 of the driver 106, the transaction data indicating the amount of fuel added to the vehicle 102 while the driver 106 was operating the fuel dispenser, and the telematics devices 114 can forward this data to the fuel amount determination module 210. By receiving the transaction data directly from the servers corresponding to the financial accounts of the user, the technology 100 can further improve, when compared to conventional systems, the efficiency and simplicity of using the technology by reducing the number of steps a user performs to facilitate the estimation of fuel economy.

In some implementations, the fueling event identification module 208, the fuel amount identification module 210, or both, are capable of determining, based at least partly on the telematics data, a fueling period of the identified fueling event in which the fueling period includes a start time of the fueling event and a stop time of the fueling event, and determining, based at least partly on the telematics data, a flow rate of the fueling event. A flow rate can refer to a rate at which fuel is added to the vehicle 102 during a fueling event. In such implementations, the fuel amount determination module 210 is capable of determining an amount of fuel added to the vehicle 102 by using the determined fueling period and determined flow rate.

In some implementations, the fueling event identification module 208, the fuel amount determination module 210, or both, are capable of predetermining the flow rate for a specific fueling station by combining previously determined fueling periods, previously received transaction data, and previously received location data of a plurality of other users of the technology 100 that have previously used the specific fueling station. For example, as previously described, each of the plurality of users of the technology 100 can use a user interface on their mobile device to transmit the input data to the fueling amount determination module 210 indicating an amount of fuel that was added their vehicle. As also previously described, for each user, the fueling event identification module 208, fueling amount determination module 210, or both, can also determine the location of the specific fueling station based on the received location data of the telematics data. Therefore, for each user, the fueling amount determination module 210 can determine a flow rate for the specific fueling station by using the received input data indicating the amount of fuel and the determined fueling period. The fueling amount determination module 210 can then aggregate the determined flow rates for the specific fueling station (for example, determine an average flow rate, median flow rate, and so forth) to generate a specific flow rate for the fueling station. The specific flow rate for that fueling station can then be used, by the fuel amount determination module 208, to determine a fueling amount for subsequent users of the technology 100 that use the specific fueling station as described previously.

Additionally, or alternatively, the fueling event identification module 208, the fuel amount determination module 210, or both are capable of determining the flow rate for a specific fuel dispenser of a fueling station. For example, the technology 100 can receive high-precision GPS data (which can have, for example, centimeter-level positioning accuracy). The position of confirmed (or validated) fueling events of vehicles of several users of the technology 100 can be collected for a particular fueling station using the high-precisions GPS data. After a number (for example, 10, 20, 50, 200 and so forth) of these confirmed fueling events for a particular fueling station, the fueling event identification module 208, the fuel amount determination module 210, or both, can group the locations and generate fueling zones (that is, the estimated location of a fueling dispenser) within the particular fueling station using the position with the highest density of data points. The fueling event identification module 208, the fuel amount determination module 210, or both, can also determine the side of the on which the fuel filler neck is located based on the type (for example, make and model) of each vehicle, which can be used as a reference to fine-tune the estimation of a fueling dispenser's location. The estimated locations can be associated with a particular fueling dispenser, the flow rate of each fueling dispenser can be determined as discussed previously, and this information can be stored in the database 136. Thus, when a fueling event is detected, the fuel amount determination module 210 can determine the particular fueling dispenser being used for the fueling event, and thus the flow rate of the fueling event, by determining the location of the vehicle corresponding to the fueling event and comparing the location of the vehicle with the information stored in the database 136.

Additionally, or alternatively the fuel amount determination module 210 can determine a specific fueling dispenser being used for a fueling event based on image data received from the camera. As an illustrative example, when the vehicle 112 includes a camera (such as a front-facing camera), image data received from the camera can indicate one or more identifiers of a fueling dispenser (such as a dispenser number), and the fuel amount determination module 210 can analyze the image data (for example, by performing optical character recognition on the image data) to determine the particular fueling dispenser being used for the fueling event. As another illustrative example, the fuel amount determination module 210 can extract the one or more identifiers from received transaction data corresponding to the fueling event, as discussed previously. In some instances, the fuel amount determination module 210 may not have enough fueling event data corresponding to a particular fueling dispenser to determine a flow rate for a particular fueling dispenser, but may have enough fueling event data to determine a flow rate for one or more other fueling dispensers of the same fueling stations as the particular fueling dispenser. In such instances, the fuel amount determination module 210 can approximate the flow rate for the particular fueling dispensers by aggregating the flow rates determined for the one or more other fueling dispensers.

As alluded to previously, vibrational patterns of the vehicle 102 can be associated with the act of adding fuel to the vehicle 102. In some implementations, the fueling event identification module 208, the fuel amount determination module 210, or both, are capable of determining, based on the vibrational patterns, a start time of when fuel was being added to the vehicle 102 (for example, when the vibrational patterns started) and an end time when fuel was no longer being added to the vehicle 102 (for example, when the vibrational patterns ended). For example, the fueling event identification module 208, the fuel amount determination module 210, or both can also associate, using one or more machine learning techniques, the vibrational patterns of the vehicle 102 with a flow rate of the fueling event. That is, for instance, the vibrational patterns of the vehicle 102 can also indicate the rate at which fuel was flowing into the vehicle 102, and the fueling event identification module 210 can learn how to associate these vibrational patterns of the vehicle with a flow rate. By knowing the fueling period and the flow rate, the fueling amount determination module 210 can determine the amount of fuel added to the vehicle 102 during the identified fueling event.

In some implementations, the fuel amount determination module 210 can determine a flow rate for a particular fueling dispenser by detecting a fueling pattern of the driver 106. For example, the fuel amount determination module 210 can determine, based on received GPS data, when the vehicle 102 has come to a stop and is near a fueling dispenser. The fuel amount determination module 210 can then determine if the driver 106 is carrying a mobile device when preparing to fuel the vehicle 102 by using, for example, data received from a gyroscope and accelerometer of the mobile device. The fuel amount determination module 210 can detect that the driver 106 is moving back towards the vehicle using, for example, a motion classifier, which can indicate that the driver 106 has placed a fuel dispensing mechanism (such as a nozzle or electrical plug-in) in the vehicle 102 to begin adding fuel to the vehicle 102. The fuel amount determination module 210 can then detect a period of time in which the driver 106 will remain substantially motionless before removing the fuel dispensing mechanism from the vehicle 102. This period of time can be used to determine the fueling period for determining the flow rate.

By determining the amount of fuel added using the received telematics data and the determined flow rate, the technology 100 can further improve, when compared to convention systems, the efficiency and simplicity of using the technology 100 by reducing the number of steps a user performs to facilitate the estimation of fuel economy.

Furthermore, flow rate data can be used to determine an estimated time of refueling for all fueling stations nearby the vehicle 102. For example, based on a description of the vehicle 102 (for example, the make and model), the technology 100 can obtain public information related to the capacity of the fuel tank of the vehicle 102. The technology 100 can also estimate the average flow rate of several locations. Using these values, the technology 100 can estimate a time of refueling (that is, an estimated fueling period) for all fueling stations within, for instance, a 2 mile radius of the vehicle 102. The technology 100 can provide these estimated fueling periods to the driver 106 (for example, through the mobile device of the driver 106), which the driver 106 can then use to select a fueling stations having the shortest estimated average fueling period. The flow rate data can also be used to identify and alert the driver 106 of hazardous situations. For example, governments may set limits on flow rate based on the type of fuel and the type of vehicle for safety reasons. The technology 100 can automatically alert the driver 106, fueling station employees, and responsible authorities if a fuel dispenser is determined to have a flow rate above the legal limit.

The fuel economy determination module 212 is capable of determining, based at least partly on the amount of fuel added to the vehicle determined by the fuel amount determination module 210 for each fueling event and the telematics data, a fuel economy for the vehicle 102. In some implementations, once a predetermined number of fuel events (for example, 5 fueling events, 10 fueling events, or more) are detected for the vehicle 102, and the amount of fuel added to the vehicle 102 during each fuel event of the predetermined number of fuel events is determined, the fuel economy determination module 212 can determine an average (or median) amount of fuel consumed by the vehicle 102 over the course of the predetermined number of fuel events. The predetermined number of fuel events can be any number suitable for determining an accurate average (or median) amount of fuel consumed and can be selected based on computational power, computational speed, and computational accuracy considerations.

As an illustrative example, assume that, for each of five detected fueling events, the fuel amount determination module 210 determines that the user added 10 gallons of gasoline to the vehicle 102. The fuel economy determination module 212 can use the received telematics data to determine a distance the vehicle 102 traveled between each fueling event, and use the added fuel amount for each of the detected five fueling events, to determine an amount of fuel consumed by the vehicle 102 between each fueling event. In some implementations, the technology 100 requests that the driver 106 provide an amount of fuel that the vehicle 102 is currently carrying immediately before or during the first detected fueling event using, for example, their mobile device, so that the fuel economy determination module 212 can use the driver 106 provided amount of fuel as a baseline for determining fuel consumption between each subsequent fueling events.

In some implementations, the fuel economy determination module 212 determines that the driver 106 added enough fuel to the vehicle 102 such that the vehicle 102 includes a maximum capacity of fuel (that is, a fuel level of a fuel reservoir of the vehicle 102, such as a fuel tank or a battery, has reached a maximum capacity). For example, refueling the vehicle 102 until the vehicle 102 reaches its maximum capacity of fuel may trigger a shut-off valve of the nozzle of the fuel dispenser. Triggering the shut-off valve can cause a unique vibration pattern, which can be detected by, for example, the one or more telematics devices 114. The fuel economy determination module 212 can be configured to detect this unique vibration pattern and associate it with a full fuel tank of the vehicle 102. Once the fuel economy determination module 212 determines the amount of fuel added to the vehicle 102, it can obtain public data indicating the maximum capacity of the fuel tank of the vehicle 102 from, for example, a server associated with the manufacturer of the vehicle 102. The fuel economy determination module 212 can then determine the amount of fuel in the vehicle 102 immediately before the identified fueling event based on the difference between the maximum fuel capacity of the vehicle 102 and the determined amount of fuel added to the vehicle 102.

In some cases, the driver 106 will not add enough fuel to the vehicle 102 such that the vehicle 102 is at full fuel capacity. In such cases, the fuel economy determination module 212 can request additional information from the driver 106 regarding the amount of fuel in the vehicle 102 after an identified fueling period. In some cases, the initial amount of fuel in the vehicle when the technology begins recording may not be known. However, even in such instances, the estimated fuel economy of the vehicle 102 can be more accurately estimated as more fueling events are detected. For example, each fueling event can be represented as:

$$V_{i,1} + \Delta V_1 = V_{f,1}$$
$$V_{i,2} + \Delta V_2 = V_{f,2}$$
$$\vdots$$
$$V_{i,n} + \Delta V_n = V_{f,n};$$

where n represents the fueling event number, $V_{i,n}$ represents the initial volume of fuel in the vehicle, $\Delta V_n$ represents the amount of fuel added to the vehicle, and $V_{f,n}$ represents the total amount of fuel in the vehicle after the fueling event. Furthermore, the total amount of fuel consumed during a period with k number of refueling events can be defined as:

$$\Sigma_{k=1}^{n} V_{f,k-1} - V_{i,k} \approx V_{f,1} - V_{i,2} + V_{f,2} - V_{i,2} + \ldots + V_{f,k-1} - V_{i,k};$$

where $\Delta V_2 = -V_{i,2} + V_{f,2}$ and $V_{f,1} = V_{i,1} + \Delta V_1$; and therefore:

$$\Sigma_{k=1}^{n} V_{f,k-1} - V_{i,k} \approx V_{f,1} + \Delta V_2 + \Delta V_3 + \ldots + \Delta V_{k-1} - V_{i,k};$$

and $$\Sigma_{k=1}^{n} V_{f,k-1} - V_{i,k} \approx V_{i,1} + \Delta V_1 + \Delta V_2 + \Delta V_3 + \ldots + \Delta V_{k-1} - V_{i,k}.$$

In some cases, all values except for $V_{i,1}$ and $V_{i,k}$ can be determined. The total fuel consumed value can be divided by the estimated distance traveled between all fueling events, and the weight of the unknown values (that is, the error) can decrease as more fueling events occur.

The notification module 214 is capable of transmitting a notification to the mobile device of the driver 106 of the vehicle 102 in which, when the mobile device receives the notification, the notification causes the mobile device to render a user interface having one or more graphical representations representing the determined fuel economy and other information related to the determined fuel economy. For example, the user interface can display the average fuel consumption per distance traveled (such as, miles per gallon, miles per kilowatt, and so forth) that was determined by the fuel economy determination module 212. In some implementations, the user interface can display a graph showing the changes in the determined fuel economy of the vehicle 102 over the course of a defined time interval (for example, the past 6 months, the past two years, and so forth). In some implementations, the notification module 214 can access the determined fuel economy of vehicles of other users having the same or similar type as the vehicle 102, determine the average fuel economy of the vehicles of the same or similar type, and the user interface can display the average fuel economy of the vehicle of the same or similar type along with the determined fuel economy of the vehicle 102. In some implementations, the average fuel economy of the vehicle of the same or similar type is limited by geography, usage, or both. For example, the average fuel economy can be determined for all or some other vehicles having the same or similar type that are currently operating in the same city as the vehicle 102. As another example, the users can indicate to the technology 100 that they use their vehicles primarily as a work vehicle, and the average fuel economy can be determined for all or some other vehicles having the same or similar type that are used primarily as a work vehicle.

In some implementations, the user interface displays a report indicating actions of the driver 106 that can be attributed, at least partly, to the determined fuel efficiency. For example, the notification module 214 can use the telematics data (that is, acceleration data, braking data, location data, change in orientation data, and so forth) to generate a driving profile of the driver 106 of the vehicle 102, and generate a report based on the driving profile. As an illustrative example, a driving profile can indicate that the driver 106 of the vehicle 102 tends to accelerate heavily from a static position and tends to traverse roads with many stop lights or having high vehicle traffic, factors that typically have a negative effect on fuel economy. The user interface can display this information to the driver 106, which may encourage the driver 106 to make changes to their driving habits that would have a positive effect on future fuel economy determinations (such as, traversing roads with less stop lights or accelerating less heavily from a static position). In some implementations, the notification module 112 can determine, based on the telematics data and the external data, one or more typical driving routes that the driver 106 traverses (that is, routes traversed more than two times a week, four times a week, once a day, and so forth), and identify alternate routes to the one or more typical routes that will have a positive effect on the fuel efficiency of the vehicle 102 (such as routes with less stop signs or vehicle traffic). The notification module 112 can generate a geographical representation showing the identified alternate routes and indicate to the driver 106 of the vehicle 102 that the alternate routes can improve the fuel efficiency. Additionally, or alternatively, the geographical representation can indicate a predicted travel time of the alternate routes.

In some implementations, the notification module 214 is capable of determining that other factors beyond the driver's 106 driving habits are causing the vehicle 102 to have subpar fuel efficiency when compared to other vehicles of the same or similar type. For example, based on external data, the notification module 214 can determine that the vehicle has been operating in inclement weather, and that such inclement weather is having a negative effect on the fuel efficiency of the vehicle 102. As another example, the notification module 214 can determine that, if weather and the driver's driving habits are not the likely or primary cause of the subpar fuel efficiency, the vehicle 102 may have a mechanical issue. In such instances, the notification module 214 can notify the driver 106 that the vehicle 102 may be experiencing a mechanical issue and, based on location data, recommend nearby (that is, within 2 miles, 5 miles, and so forth) mechanic service providers to the driver 106.

In some implementations, the notification module 214 is capable of comparing the driver's 106 driving profile with the driving profiles of other users of the technology 100, and the notification module 214 can recommend a vehicle type (for example, in terms of one or more of: make; model; or year) optimized for the driver's 106 driving habits that relate to fuel economy performance. For example, assume that, measured over a year-long period, the driver's 106 driving profile causes the vehicle's 102 average fuel economy performance to be 10 miles per gallon less than the average fuel economy performance of other vehicles of the same or similar type when driven by all (or some) other users of the same or similar type of vehicle. The notification module 214 can compare the negative effects that the driver's 106 driving profile have on the average fuel economy performance of the vehicle with effects on average fuel economy performance of other types of vehicles of other users having similar driving habits and, if it is determined that the other users' driving performance has less of an effect on the average fuel economy performance of the other types of vehicles, the notification module 214 can send a notification to the user recommending that the user purchase at least one of the other types of vehicles.

In some implementations, the notification module 214 is capable of alerting the driver 106 of drastic changes in determined fuel economy of the vehicle 102 by, for example, transmitting a notification to the mobile device of the user. A drastic change can be a change in determined fuel economy over a defined time or number of events that exceeds a threshold change. For example, assume that the threshold change is a reduction of fuel economy by 10 miles per gallon. If the determined fuel economy of the vehicle 102 is reduced by more than 10 miles per gallon from a first month to a subsequent month, the notification module 214 can transmit a notification to the mobile device of the driver 106 to alert the driver 106 of the drastic change. In some implementations, the threshold change corresponds to a change in fuel economy of the vehicle 102 known to indicate a likely mechanical issue and, therefore, the notification can indicate that the vehicle 102 is possibly experiencing a mechanical issue.

Although specific modules, including the fueling event identification module 208, the fuel amount determination module 210, the fuel economy determination module 212, and the notification module 214 are described as carrying out certain aspects of the techniques described here, some or all of the techniques may be carried out by additional, fewer, or alternative modules in some implementations.

Figure 3:
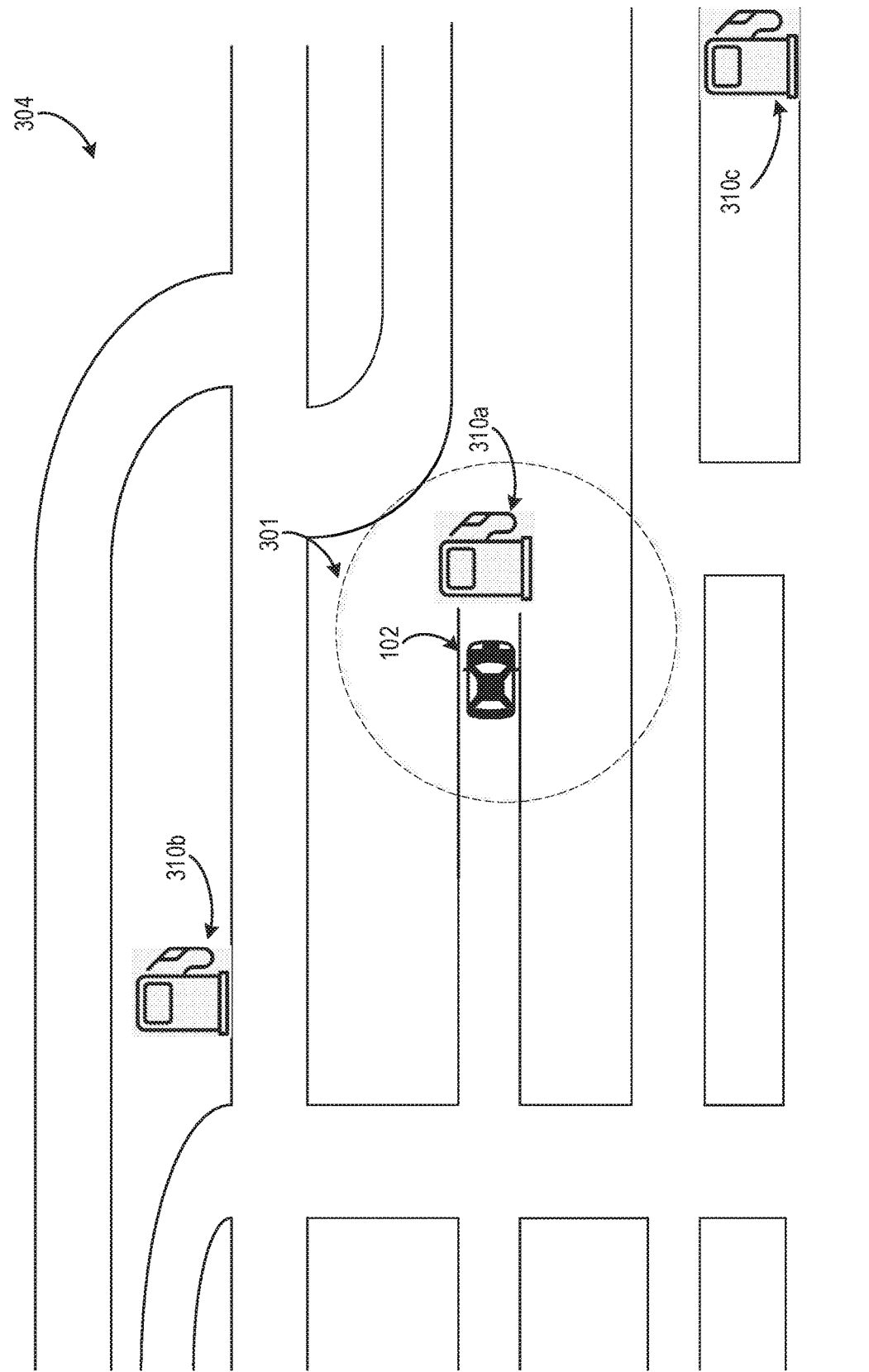
FIG. 3 illustrates a vehicle and one or more fueling providers within a geographical radius of the vehicle.

FIG. 3 illustrates a vehicle 102 and one or more fueling stations within a threshold geographical radius 301 of the vehicle 102. The vehicle 102 is operating in an environment 304, which includes a first fueling station 310*a*, a second fueling station 310*b*, and a third fueling station 310*c*. As indicated previously, fueling station can be a facility that sells fuel (such as, gasoline, electrical energy, etc.) and can include one or more fueling dispensers (such as, gas pumps, charging stations, etc.). As indicated previously, the server 130 can identify a fueling event of the vehicle 102 by determining that, based at least partly on the received telematics data, the vehicle 102 has come to a stop and is within a predetermined range of a fueling station. As shown, the vehicle 102 has come to a stop, and the first fueling station 310*a*, which includes one or more fueling stations, is within the threshold geographical radius 301 (that is, predetermined range) of the vehicle 102. Accordingly, server 130 determines that the vehicle 102 is undergoing a fueling event. The threshold geographical radius 310 can correspond to any distance that reasonably infers that the vehicle 102 is being refueled at a fueling station (for example, 25 feet, 100 feet, 500 feet, and so forth). In some implementations, the vehicle 102 is required to maintain a static position for a predetermined time interval before the server 130 determines that the vehicle 102 is undergoing a fueling event. The predetermined time can be any time that reasonably provides assurances that the vehicle 102 is stopped for a fueling event. For example, the vehicle 102 can be required to maintain a static position of 30 seconds before the server 130 determines that the vehicle 102 is undergoing a fueling event.

Figure 4:
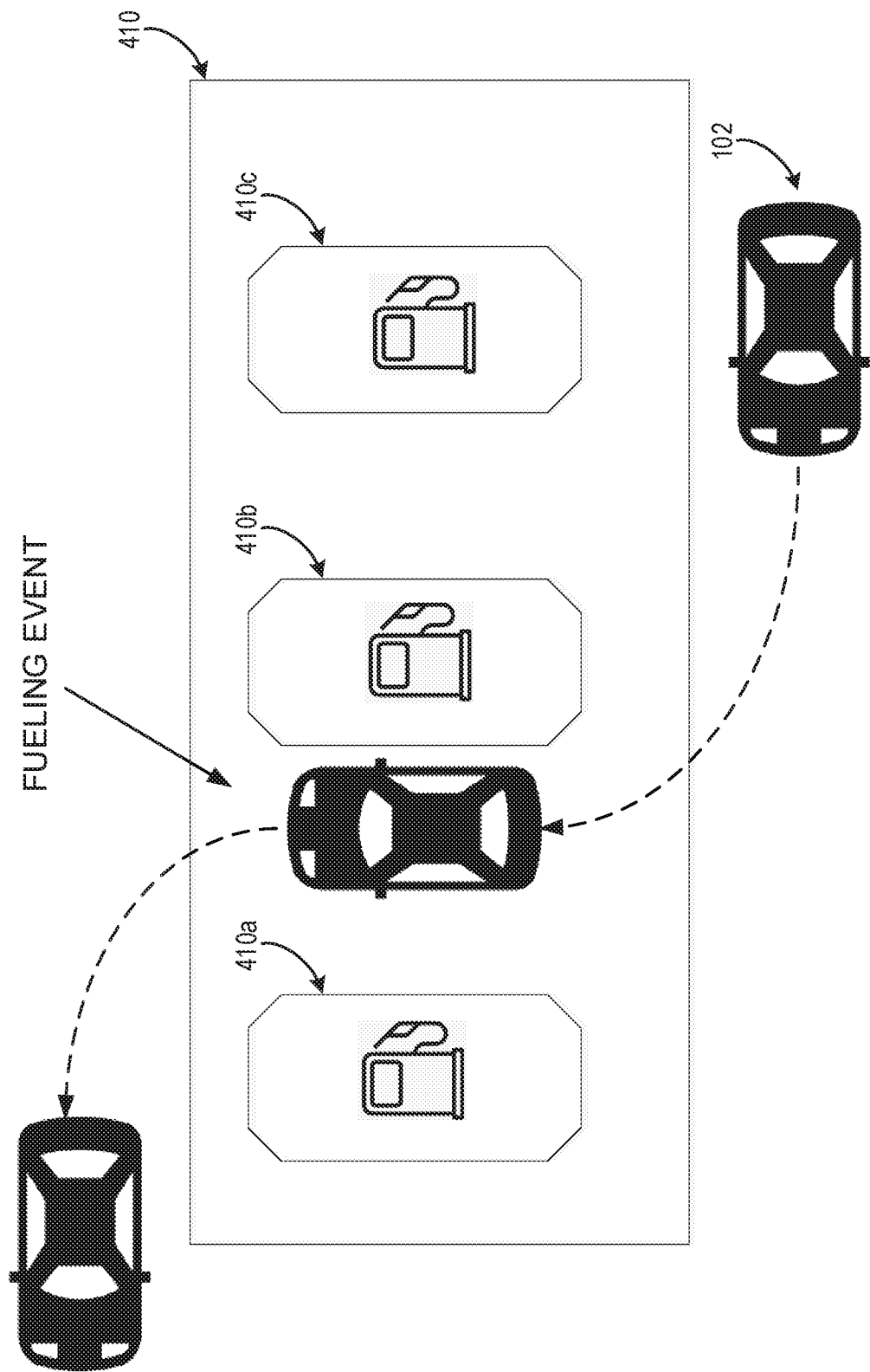
FIG. 4 illustrates an example of detecting a fueling event.
Figure 5:
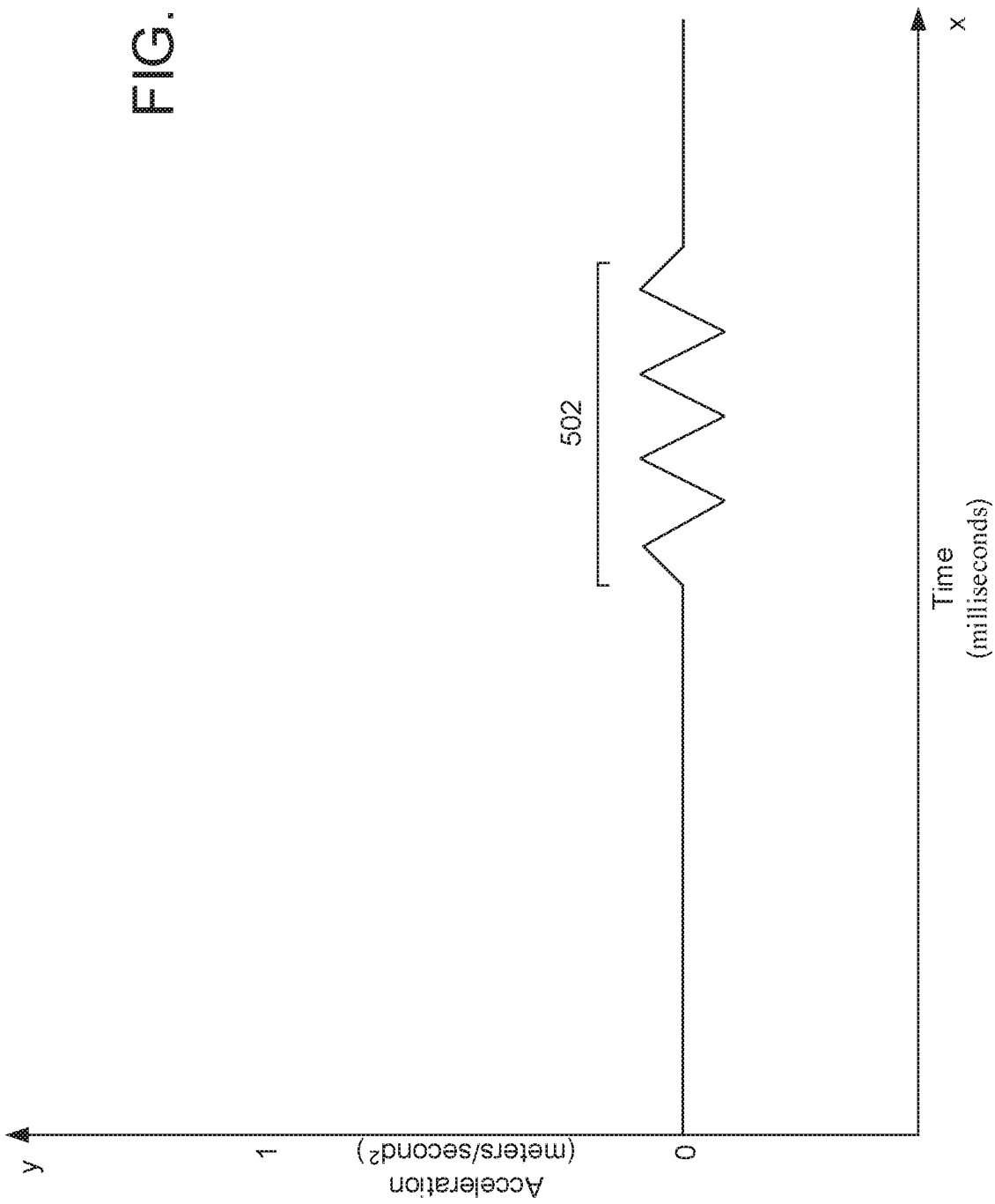
FIG. 5 is a graph illustrating an example of detecting a fueling event.

FIG. 4 illustrates an example of detecting a fueling event and FIG. 5 is a graph illustrating an example of detecting a fueling event. Referring to FIG. 4, the vehicle 102 maneuvers towards a fueling station 410, which includes a first fueling dispenser 410*a*, a second fueling dispenser 410*b*, and a third fueling dispenser 410*c*. The vehicle 102 comes to a stop at the second fueling dispenser 410*b*, and maintains a static position for a predetermine time (for example, one minute). The driver 106 of the vehicle 102 proceeds to add fuel from the second fueling dispenser 410*b* to the vehicle 102. Once the user is done adding fuel to the vehicle 102, the vehicle 102 maneuvers away from the fueling provider 410.

Referring to FIG. 5, the shown graph illustrates acceleration (meters/second) in the "y" axis and time (milliseconds) in the "x' axis. When the fuel is being added to the vehicle 102 from the second fueling dispenser 410b, the vehicle 102 is caused to exhibit a particular vibration pattern 502. As indicated previously with reference to FIG. 2, the server 130 can identify a fueling event of the vehicle 102 by detecting the vibrational pattern 502 and associating the vibration pattern 502 with a fueling event of the vehicle 102.

Figure 6:
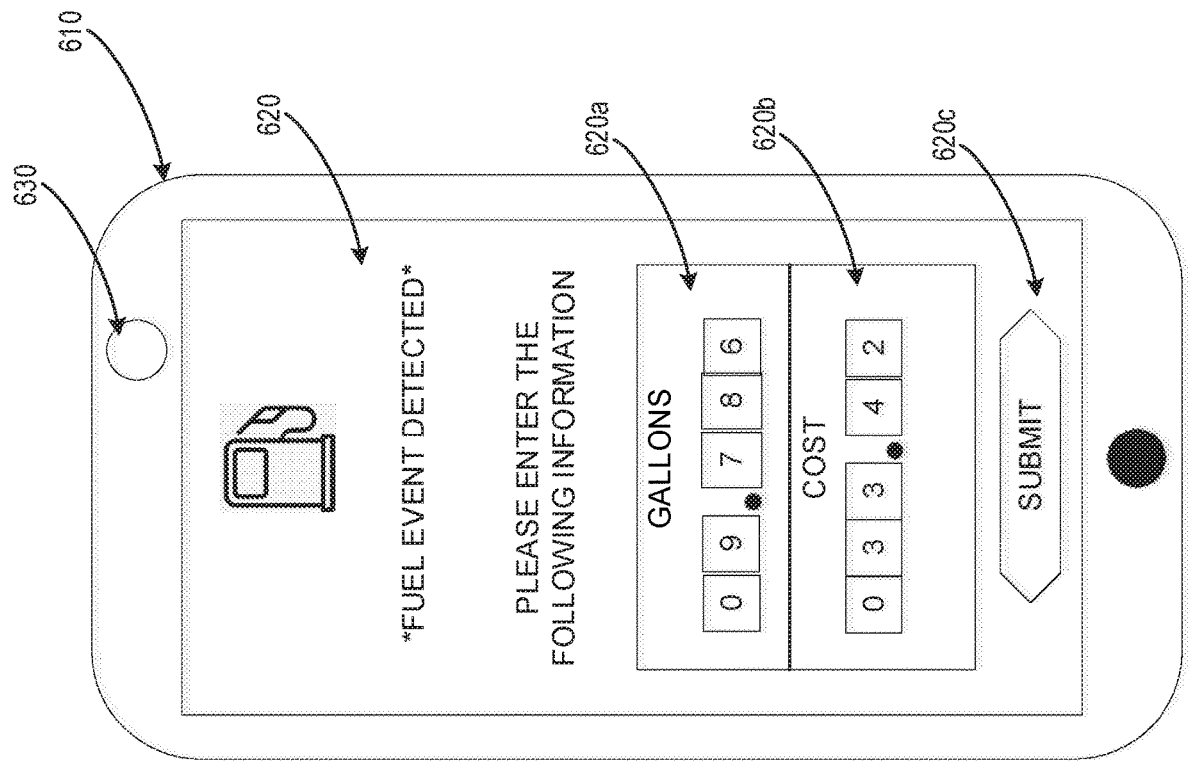
FIG. 6 illustrates an example user interface rendered on a mobile device.

FIG. 6 illustrates an example user interface 620 rendered on a mobile device 610. The mobile device 610 can be the mobile device of the driver 106 of the vehicle 102. As indicated previously with reference to FIG. 2, the server 130 can determine an amount of fuel added to the vehicle 102 by transmitting a notification to the mobile device 610 of the vehicle 102 in which, when the mobile device 610 receives the notification, the notification causes the mobile device 610 to render the user interface 620. The user interface 620 includes first fields 620a that the driver 106 can use to enter an amount of fuel added to the vehicle 102 during the identified fueling event. The user interface 620 includes second fields 620b that the driver 106 can use to enter the cost of adding the amount of fuel indicated in the first fields 620a. The user interface 620 includes a selectable submit icon 620c, that when selected by the driver 106, causes the mobile device 610 to generate user input data representing the driver 106 entered values of the first and second fields 620a,620b, and transmit the user input data to the server 130 for processing (for example, by the fuel amount determination module 210).

The mobile device 610 can also include an imaging sensor 630 (such as, a camera). As indicated previously with reference to FIG. 2, the driver 106 can use the imaging sensor 630 to capture image data representing a document (such as a transaction receipt) indicating the amount of fuel added to the vehicle 102. In some implementations, the mobile device 610 can perform one or more character identification algorithms on the captured image data, and fill in the fields 620a,620b automatically based on an output of the algorithms. In some implementations, the captured image data is transmitted to the server 130, and the server 130 performs one or more character identification algorithms on the captured image data to determine an amount of fuel added to the vehicle 102.

Figure 7:
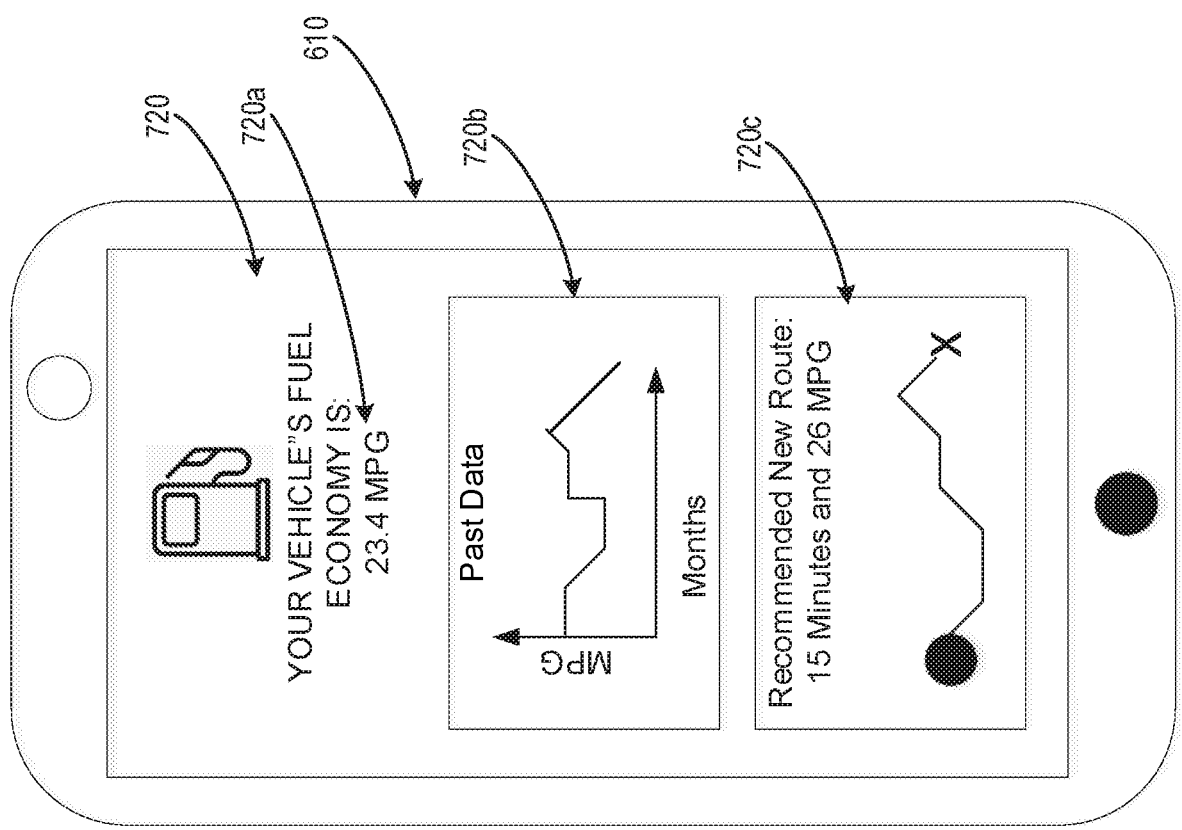
FIG. 7 illustrates an example user interface rendered on a mobile device.

FIG. 7 illustrates an example user interface 720 rendered on the mobile device 610. As indicated previously with reference to FIG. 2, the server 130 can transmit notification to the mobile device 610 of the driver 106 of the vehicle 102 in which, when the mobile device 610 receives the notification, the notification causes the mobile device 610 to render the user interface 720 having one or more graphical representations representing the determined fuel economy of the vehicle 102 and other information related to the determined fuel economy. The user interface 720 includes a fuel economy indicator 720a that indicates the determined fuel economy. The user interface 720 also includes a graph 720b that indicates historical fuel economy determination over several months. The user interface 720 includes a generate geographical representation 720c that shows an alternate route generated by the server 130 that the driver 106 can use instead of the driver's 106 identified typical route. The geographical representation 720c also indicates a predicted fuel economy (in this example, 26 miles per gallon) of the vehicle 102 and estimated commute time (in this example, 15 minutes) that would result if the driver 106 would replace the identified typical route with the alternate route.

Figure 8:
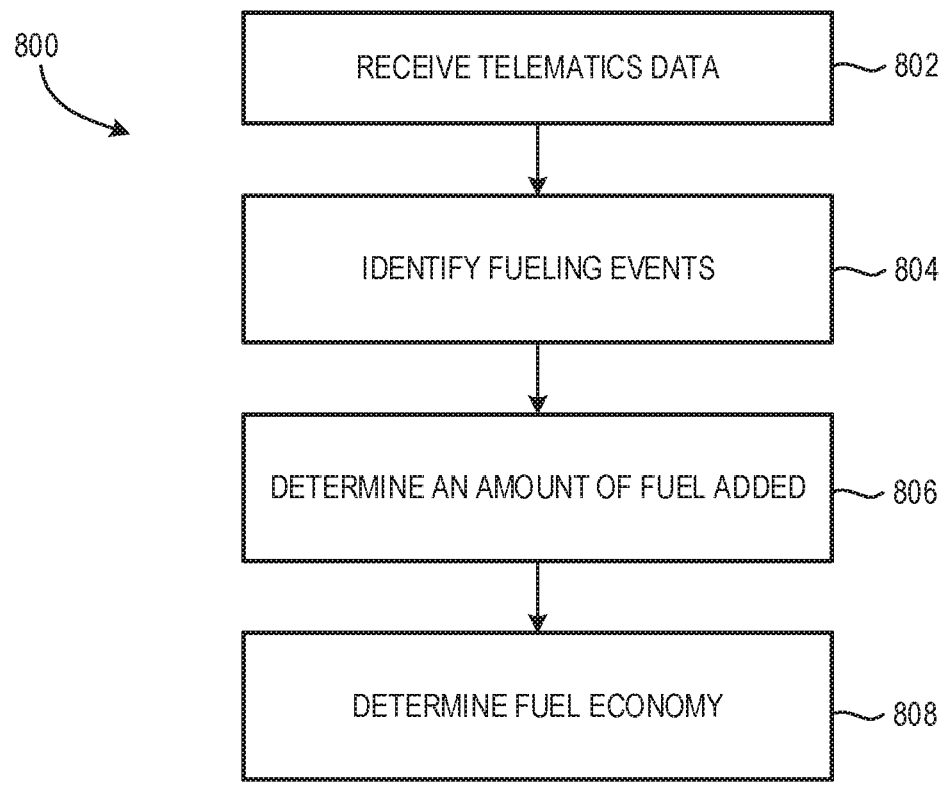
FIG. 8 is a flowchart illustrating an example method for estimating fuel economy.

FIG. 8 is a flowchart illustrating an example method 800 for estimating fuel economy. For illustrative purposes, the method 800 will be described as being performed by the technology 100 discussed previously with reference to FIGS. 1-2. The method 800 includes receiving telematics data (block 802), identifying fueling events (block 804), determining an amount of fuel added (block 806), and determining fuel economy (block 808).

At block 802, telematics data is received by the server 130. The telematics data can be produced, at least partly, by one or more sensors at the vehicle 102. The telematics data can include, for example, one or more of: acceleration data of the vehicle 102 as the vehicle maneuvers throughout the environment 104, velocity data of the vehicle 102 as the vehicle 102 maneuvers throughout the environment 104, orientation data of the vehicle 102 as the vehicle 102 maneuvers throughout the environment 104, or location data (for example, GPS data) as the vehicle 102 maneuvers throughout the environment 104.

At block 804, the server 130 identifies one or more fueling events of the vehicle based at least partly on the received telematics data. As indicated previously with reference to FIG. 2, the server 130 can identify the one or more fueling events of the vehicle 102 by, determining, based at least partly on the received telematics data, that the vehicle 102 has come to a stop and is within a predetermined range of a fueling station. Additionally, or alternatively, the server 130 can identify a fueling event of the vehicle 102 by detecting a specific vibrational pattern of the vehicle 102 and associating the vibrational pattern with a fueling event of the vehicle, as described previously with reference to FIG. 2.

At block 806, the server 130 determines, for each fueling event of the one or more fueling events, an amount of fuel added to the vehicle 102. For example, the driver 106 can use their mobile device to indicate an amount of fuel added to the vehicle 102 during a fueling event, as described previously with reference to FIGS. 2 and 6. The server 130 can receive transaction data from a financial institution of the driver 106, from a communications device at a fuel dispenser of a fueling station, or both, and use the transaction data to determine an amount of fuel, as described previously with reference to FIG. 2. The server 130 can determine an amount of fuel added to the vehicle 102 by determining a fueling period, a flow rate, or both, and using these determinations to determine the amount of fuel, as described previously with reference to FIG. 2.

At block 808, the server 130 determines a fuel economy of the vehicle 102 based, at least partly, on the amount of fuel added to the vehicle 102 for each fueling event and the received telematics data. As described previously with reference to FIG. 2, the server 130 can use the telematics data to determine an amount of fuel consumed between each fueling event, and use the amount of fuel consumed, and the amount of fuel added, to determine the fuel economy of the vehicle 102.

In some implementations, the method 800 includes transmitting a notification to a mobile device of a user of the vehicle 102 in which, when the mobile device receives the notification, the notification causes the mobile device to render a user interface having one or more graphical representations representing the determined fuel economy. In some implementations, the method 800 includes identifying, based on the telematics data, a first route of travel by the driver 106 that corresponds to the determined fuel economy of the vehicle 102, identifying a second route that is different than the first route, generating a geographical representation that includes geographical locations corresponding to the second route; and transmitting a notification to the mobile device of the driver 106. The second route can increase the fuel economy of the vehicle 102 relative to the first route. When the mobile device receives the notification, the notification can cause the mobile device to render a user interface that includes the geographical representation. The geographical representation can include an overlay indicating the second route. Other implementations are also within the scope of the following claims.

What is claimed is:

1. A computer-implemented method performed by at least one processor, comprising:
    retrieving, by the at least one processor and from a hardware storage device, telematics data produced by one or more accelerometers that are not electrically connected to a vehicle;
    processing, by the at least one processor, the telematics data with at least one machine learning model to detect one or more vibrational patterns at the vehicle that are indicative of a fueling event;
    transmitting a notification to a mobile device of a user of the vehicle, the notification configured to cause the mobile device to render a user interface with a prompt to the user to confirm the fueling event;
    receiving, from the mobile device, user input data confirming the fueling event;
    determining, by the at least one processor, an amount of fuel added to the vehicle for the fueling event; and
    determining, by the at least one processor based at least partly on the amount of fuel added to the vehicle for the fueling event and the telematics data, a fuel economy of the vehicle.

2. The method of claim 1, in which the one or more accelerometers comprise at least one accelerometer included within a mobile device.

3. The method of claim 1, in which the telematics data comprises at least one of: acceleration data of the vehicle, velocity data of a vehicle, orientation data of a vehicle, or location data of the vehicle.

4. The method of claim 1, in which the amount of fuel comprises an amount of gasoline, diesel, ethanol, biodiesel, propane, or compressed natural gas.

5. The method of claim 1, in which the amount of fuel comprises an amount of electrical energy.

6. The method of claim 1, comprising:
    receiving external data from an external server, the external data comprising geographical data; and
    in which identifying the event comprises determining, based at least partly on the external data, that the vehicle has come to a stop and is within a predetermined range of a fueling station.

7. The method of claim 1, in which determining the amount of fuel comprises:
    transmitting a notification to a mobile device of a user of the vehicle in which, when the mobile device receives the notification, the notification causes the mobile device to render a user interface having one or more graphical representations prompting the user to provide the amount of fuel; and
    receiving, from the mobile device, user input data indicating the amount of fuel.

8. The method of claim 7, in which the one or more graphical representations comprise one or more data fields prompting the user to provide one or more values indicating the amount of fuel, and in which the user input data represents the one or more values entered by the user.

9. The method of claim 7, in which the one or more graphical representations:
    comprise one or more data fields; and
    prompts the user to provide the amount of fuel by capturing, using an imaging sensor of the mobile device, image data representing a document that indicates the amount of fuel;
    in which the mobile device is configured to perform one or more optical character recognition techniques on the image data and automatically provides one or more values to the one or more data fields indicating the amount of fuel based on a result of performing.

10. The method of claim 7, in which the user input data comprises image data representing an image of a document indicating the amount of fuel, and in which determining the amount of fuel comprises performing one or more optical character recognition techniques on the image data.

11. The method of claim 1, in which determining the amount of fuel comprises:
    receiving, from a financial institution of a user, transaction data indicating the amount of fuel.

12. The method of claim 1, in which determining the amount of fuel comprises:
    receiving, from a communications device at a fuel dispenser, transaction data indicating the amount of fuel.

13. The method of claim 1, in which determining the amount of fuel comprises:
    determining, based at least partly on the telematics data, a fueling period of the fueling event, the fueling period including a start time of the fueling event and a stop time of the fueling event; and
    determining, based at least partly on the telematics data, a flow rate of the fueling event.

14. The method of claim 13, in which determining the flow rate comprises determining a vibrational pattern of the vehicle.

15. The method of claim 13, in which determining the flow rate comprises detecting a fueling pattern of a user of the vehicle.

16. The method of claim 1, comprising:
    transmitting a notification to a mobile device of a user of the vehicle in which, when the mobile device receives the notification, the notification causes the mobile device to render a user interface having one or more graphical representations indicating the determined fuel economy.

17. The method of claim 1, comprising:
    identifying, based on the telematics data, a first route of travel by a user that corresponds to the determined fuel economy;
    identifying a second route that is different than the first route, the second route capable of increasing the fuel economy relative to the first route;
    generating a geographical representation that includes geographical locations corresponding to the second route; and
    transmitting, to a mobile device of the user, a notification in which, when the mobile device receives the notification, the notification causes the mobile device to render a user interface comprising the geographical representation, the geographical representation comprising an overlay indicating the second route.

18. The method of claim 1, comprising:
    determining, based on the telematics data, a driving profile of a user of the vehicle.

19. The method of claim 18, in which the vehicle comprises a first type, the method comprising:
   determining a second vehicle comprising a second type based, at least partly, on the driving profile and the determined fuel economy.

20. The method of claim 18, comprising:
   identifying, based on the driving profile, one or more factors of the driving profile that caused, at least partly, the determined fuel economy; and
   transmitting a notification to a mobile device of a user of the vehicle in which, when the mobile device receives the notification, the notification causes the mobile device to render a user interface having one or more graphical representations indicating the identified one or more factors.

21. The method of claim 1, comprising:
   determining, based on the telematics data and the determined fuel economy, that the vehicle is likely experiencing one or more mechanical issues; and
   transmitting a notification to a mobile device of a user of the vehicle in which, when the mobile device receives the notification, the notification causes the mobile device to render a user interface having one or more graphical representations indicating that the vehicle is likely experiencing one or more mechanical issues.

22. The method of claim 21, in which the one or more graphical representations comprise a geographical representation having one or more icons that indicate locations of vehicle mechanic service providers.

23. A system, comprising:
   one or more processors; and
   computer storage storing executable computer instructions in which, when executed by the one or more processors, cause the one or more processors to perform operations comprising:
   retrieving, from a hardware storage device, telematics data produced by one or more accelerometers that are not electrically connected to a vehicle;
   processing the telematics data with at least one machine learning model to detect one or more vibrational patterns at the vehicle that are indicative of a fueling event;
   transmitting a notification to a mobile device of a user of the vehicle, the notification configured to cause the mobile device to render a user interface with a prompt to the user to confirm the fueling event;
   receiving, from the mobile device, user input data confirming the fueling event;
   determining an amount of fuel added to the vehicle for the fueling event; and
   determining, based at least partly on the amount of fuel added to the vehicle for the fueling event and the telematics data, a fuel economy of the vehicle.

24. The system of claim 23, in which the one or more accelerometers comprise at least one accelerometer included within a mobile device.

25. The system of claim 23, in which the telematics data comprises at least one of:
   acceleration data of the vehicle, velocity data of a vehicle, orientation data of a vehicle, or location data of the vehicle.

26. The system of claim 23, the operations comprising:
   receiving external data from an external server, the external data comprising geographical data; and
   in which identifying the fueling event comprises determining, based at least partly on the external data, that the vehicle has come to a stop and is within a predetermined range of a fueling station.

27. The system of claim 23, in which determining the amount of fuel comprises:
   transmitting a notification to a mobile device of a user of the vehicle in which, when the mobile device receives the notification, the notification causes the mobile device to render a user interface having one or more graphical representations prompting the user to provide the amount of fuel; and
   receiving, from the mobile device, user input data indicating the amount of fuel.

28. The system of claim 27, in which the one or more graphical representations comprise one or more data fields prompting the user to provide one or more values indicating the amount of fuel, and in which the user input data represents the one or more values entered by the user.

29. The system of claim 27, in which the one or more graphical representations:
   comprise one or more data fields; and
   prompts the user to provide the amount of fuel by capturing, using an imaging sensor of the mobile device, image data representing a document that indicates the amount of fuel;
   in which the mobile device is configured to perform one or more optical character recognition techniques on the image data and automatically provide one or more values to the one or more data fields indicating the amount of fuel based on a result of performing.

30. The system of claim 27, in which the user input data comprises image data representing an image of a document indicating the amount of fuel, and in which determining the amount of fuel comprises performing one or more optical character recognition techniques on the image data.

31. The system of claim 23, in which determining the amount of fuel comprises:
   receiving, from a financial institution of a user, transaction data indicating the amount of fuel.

32. The system of claim 23, in which determining the amount of fuel comprises:
   receiving, from a communications device at a fuel dispenser, transaction data indicating the amount of fuel.

33. The system of claim 23, in which determining the amount of fuel comprises:
   determining, based at least partly on the telematics data, a fueling period of the fueling event, the fueling period including a start time of the fueling event and a stop time of the fueling event; and
   determining, based at least partly on the telematics data, a flow rate of the fueling event.

34. The system of claim 33, in which determining the flow rate comprises determining a vibrational pattern of the vehicle.

35. The system of claim 33, in which determining the flow rate comprises detecting a fueling pattern of a user of the vehicle.

36. The system of claim 23, the operations comprising:
   transmitting a notification to a mobile device of a user of the vehicle in which, when the mobile device receives the notification, the notification causes the mobile device to render a user interface having one or more graphical representations indicating the determined fuel economy.

37. The system of claim 23, the operations comprising:
   identifying, based on the telematics data, a first route of travel by a user that corresponds to the determined fuel economy;

identifying a second route that is different than the first route, the second route capable of increasing the fuel economy relative to the first route;
generating a geographical representation that includes geographical locations corresponding to the second route; and
transmitting, to a mobile device of the user, a notification in which, when the mobile device receives the notification, the notification causes the mobile device to render a user interface comprising the geographical representation, the geographical representation comprising an overlay indicating the second route.

38. The system of claim 23, the operations comprising:
determining, based on the telematics data, a driving profile of a user of the vehicle.

39. The system of claim 38, in which the vehicle comprises a first type, the operations comprising:
determining a second vehicle comprising a second type based, at least partly, on the driving profile and the determined fuel economy.

40. The system of claim 38, the operations comprising:
identifying, based on the driving profile, one or more factors of the driving profile that caused, at least partly, the determined fuel economy; and
transmitting a notification to a mobile device of a user of the vehicle in which, when the mobile device receives the notification, the notification causes the mobile device to render a user interface having one or more graphical representations indicating the identified one or more factors.

41. The system of claim 23, the operations comprising:
determining, based on the telematics data and the determined fuel economy, that the vehicle is likely experiencing one or more mechanical issues; and
transmitting a notification to a mobile device of a user of the vehicle in which, when the mobile device receives the notification, the notification causes the mobile device to render a user interface having one or more graphical representations indicating that the vehicle is likely experiencing one or more mechanical issues.

42. The system of claim 41, in which the one or more graphical representations comprise a geographical representation having one or more icons that indicate locations of vehicle mechanic service providers.

43. A non-transitory computer-readable storage medium having instructions executable by one or more processors to cause the processors to perform operations comprising:
retrieving, from a hardware storage device, telematics data produced by one or more accelerometers that are not electrically connected to a vehicle;
processing the telematics data with at least one machine learning model to detect one or more vibrational patterns at the vehicle that are indicative of a fueling event;
transmitting a notification to a mobile device of a user of the vehicle, the notification configured to cause the mobile device to render a user interface with a prompt to the user to confirm the fueling event;
receiving, from the mobile device, user input data confirming the fueling event;
determining an amount of fuel added to the vehicle for the fueling event; and
determining, based at least partly on the amount of fuel added to the vehicle for the fueling event and the telematics data, a fuel economy of the vehicle.

44. The method of claim 1, wherein the fueling event comprises a possible fueling event.

* * * * *